(12) United States Patent
Kapur et al.

(10) Patent No.: US 9,202,176 B1
(45) Date of Patent: Dec. 1, 2015

(54) ENTITY ANALYSIS SYSTEM

(75) Inventors: Amit R. Kapur, Venice, CA (US);
Steven F. Pearman, Redondo Beach, CA (US); James R. Benedetto, Hermosa Beach, CA (US)

(73) Assignee: GRAVITY.COM, INC., Dulles, VA (US)

( * ) Notice: Subject to any disclaimer, the term of this patent is extended or adjusted under 35 U.S.C. 154(b) by 892 days.

(21) Appl. No.: 13/205,585

(22) Filed: Aug. 8, 2011

(51) Int. Cl.
*G06N 99/00* (2010.01)

(52) U.S. Cl.
CPC .................................... *G06N 99/005* (2013.01)

(58) Field of Classification Search
CPC .. G06N 99/005; G06K 9/6256; G06K 9/6269
See application file for complete search history.

(56) References Cited

U.S. PATENT DOCUMENTS

| | | | | |
|---|---|---|---|---|
| 4,965,763 | A * | 10/1990 | Zamora | 704/1 |
| 6,263,335 | B1 * | 7/2001 | Paik et al. | |
| 8,280,898 | B1 * | 10/2012 | Jung et al. | 707/758 |
| 8,655,646 | B2 * | 2/2014 | Lee et al. | 704/9 |
| 2005/0234968 | A1 * | 10/2005 | Arumainayagam et al. | 707/102 |
| 2007/0100814 | A1 * | 5/2007 | Lee et al. | 707/5 |
| 2009/0192954 | A1 * | 7/2009 | Katukuri et al. | 706/11 |
| 2010/0121889 | A1 * | 5/2010 | Arumainayagam et al. | 707/803 |
| 2010/0250472 | A1 * | 9/2010 | Luk | 706/12 |
| 2011/0010685 | A1 * | 1/2011 | Sureka et al. | 717/102 |

OTHER PUBLICATIONS

Coupled Semi-Supervised Learning for Information Extraction, published Feb. 2010.*
A corpus-based bootstrapping algorithm for Semi-Automated semantic lexicon construction, by Riloff, published 1999.*
A survey of named entity recognition and classification, by Nadeau, published 2007.*
A Bootstrapping Method for Learning Semantic Lexicons using Extraction Pattern Contexts, by Thelen, published 2002.*
Extracting Conceptual knowledge from Text Using Explicit Relation Markers, by Bowden, published 1996.*
Identifying Relations for Open Information Extraction, by Fader et al., published Jul. 27, 2011.*
Acquisition of Domain Knowledge, by Yangarber, published 2003.*
Carlson, A., et al., "Coupling Semi-Supervised Learning of Categories and Relations," In Proceedings of the NAACL HLT Workshop on Semi-supervised Learning for Natural Language Processing, Jun. 2009, pp. 1-9.

(Continued)

*Primary Examiner* — Jeffrey A Gaffin
*Assistant Examiner* — Thomas Fink
(74) *Attorney, Agent, or Firm* — Bookoff McAndrews, PLLC

(57) ABSTRACT

A method for building a factual database of concepts and entities that are related to the concepts through a learning process. Training content (e.g., news articles, books) and a set of entities (e.g., Bill Clinton and Barack Obama) that are related to a concept (e.g., Presidents) is received. Groups of words that co-occur frequently in the textual content in conjunction with the entities are identified as templates. Templates may also be identified by analyzing parts-of-speech patterns of the templates. Entities that co-occur frequently in the textual content in conjunction with the templates are identified as additional related entities (e.g., Ronald Reagan and Richard Nixon). To eliminate erroneous results, the identified entities may be presented to a user who removes any false positives. The entities are then stored in association with the concept.

20 Claims, 5 Drawing Sheets

(56) References Cited

OTHER PUBLICATIONS

Carlson, A., et al., "Coupled Semi-Supervised Learned for Information Extraction," WSDM'10, Feb. 4-6, 2010, pp. 101-110, New York City, New York, USA.

Carlson, A., et al., "Toward an Architecture for Never-Ending Language Learning," Proceedings of the Conference on Artificial Intelligence (AAAI), 2010, pp. 1306-1313, Association for the Advancement of Artificial Intelligence.

Michell, T., et al., "Populating the Semantic Web by Macro-Reading Internet Text," In Proceedings of the International Semantic Web Conference (ISWC), 2009, pp. 998-1002.

"Read the Web," Research Project at Carnegie Mellon University, 1 page [online] [Archived on web.archive.org on Apr. 29, 2011] [Retrieved on Jan. 27, 2012] Retrieved from the internet <URL:http://web.archive.org/web/20110429224524/http://rtw.ml.cmu.edu/rtw/>.

* cited by examiner

ENTITY ANALYSIS SYSTEM

BACKGROUND

1. Field of Art

The disclosure generally relates to the field of language processing, and more specifically, to a system for identifying related entities.

2. Description of the Related Art

The goal of language processing is to understand language data, such as paragraphs of text on a website. Modern natural language processing techniques are grounded in unsupervised or semi-supervised machine learning. Both types of machine learning attempt to automatically generate rules that are then used to analyze language data. Due to the complex relationships in language data, generating these rules is a difficult task. In particular, conventional language processing techniques are limited in their abilities to identify relationships between entities and concepts in language data.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium builds a factual database of concepts and the entities that are related to the concepts. For example, if a concept is "US Presidents," the disclosed embodiments process training content to build a knowledgebase of entities that are "US Presidents," such as "Bill Clinton," "Barack Obama," "George Bush," and "Abraham Lincoln." As another example, if a concept is "Sports," the disclosed embodiments process textual content to build a knowledgebase of entities that are "Sports," such as "Football," "Basketball," "Soccer" and "Tennis."

In one embodiment, training content (e.g., news articles, books) and a set of entities (e.g., Bill Clinton and Barack Obama) that are related to a concept (e.g., US Presidents) is received. Groups of words that co-occur frequently in the textual content in conjunction with the entities are identified as templates. For example, if the set of received entities includes "Bill Clinton" and "Barack Obama", the templates may be " . . . was elected" and "United States President . . . " In some embodiments, templates are also identified by analyzing parts-of-speech patterns of the templates. Entities that co-occur frequently in the textual content in conjunction with the templates are identified as candidate entities (e.g., Ronald Reagan and Richard Nixon). To eliminate any false positives, the candidate entities are presented to a user and a user input removes one or more of the entities. The process of identifying entities and templates may iterate several times, identifying additional entities with each iteration. The entities are stored in association with the concept, which can later be used for analyzing other content.

Computing Machine Architecture

Figure 1:
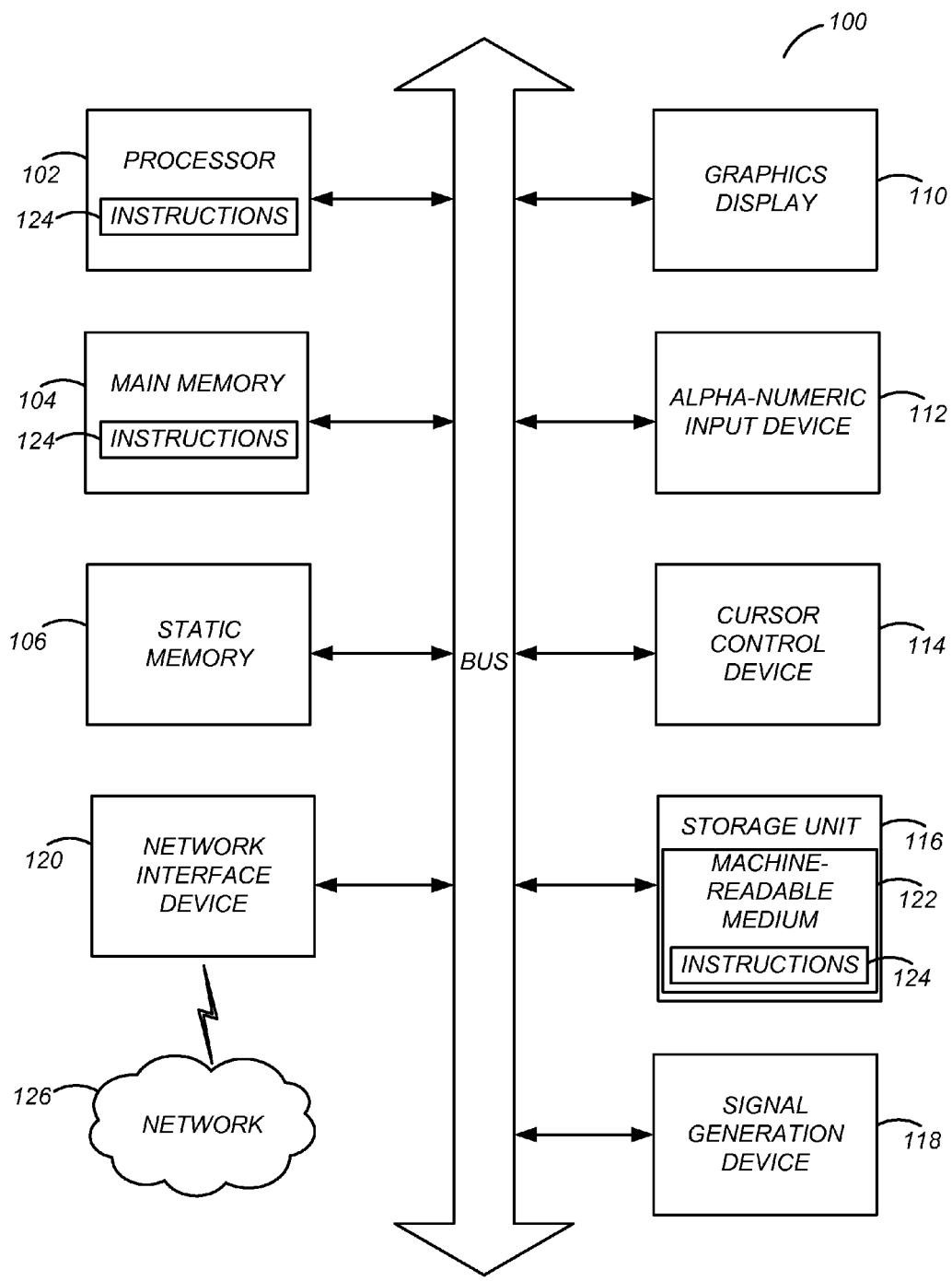
FIG. 1 illustrates components of an example machine able to read instructions from a machine-readable medium and execute them in a processor or controller according to one embodiment.

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 820, which also are configured to communicate via the bus 108.

Figure 2:
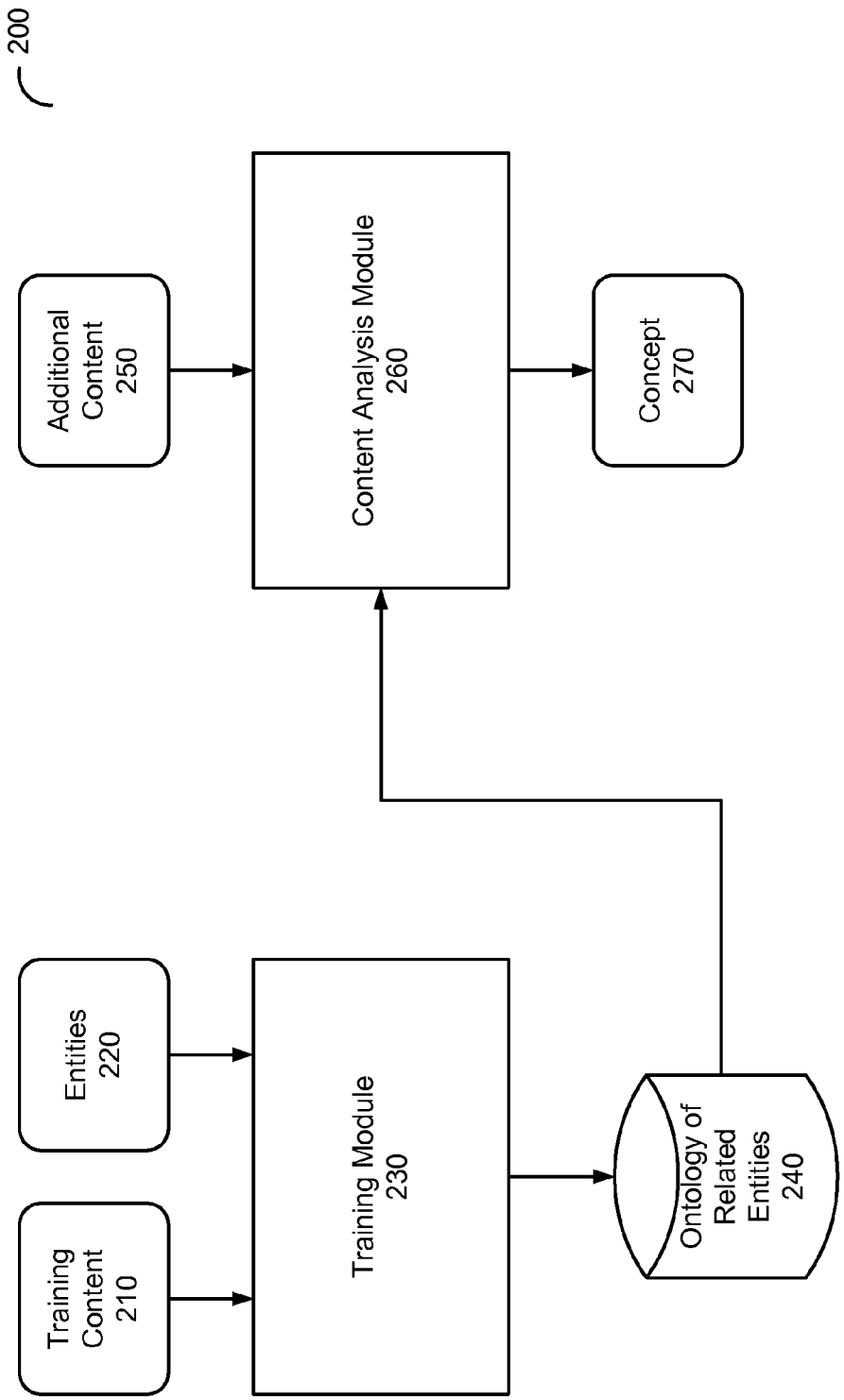
FIG. 2 illustrates a high-level block diagram of the entity analysis system according to one embodiment.
Figure 3A:
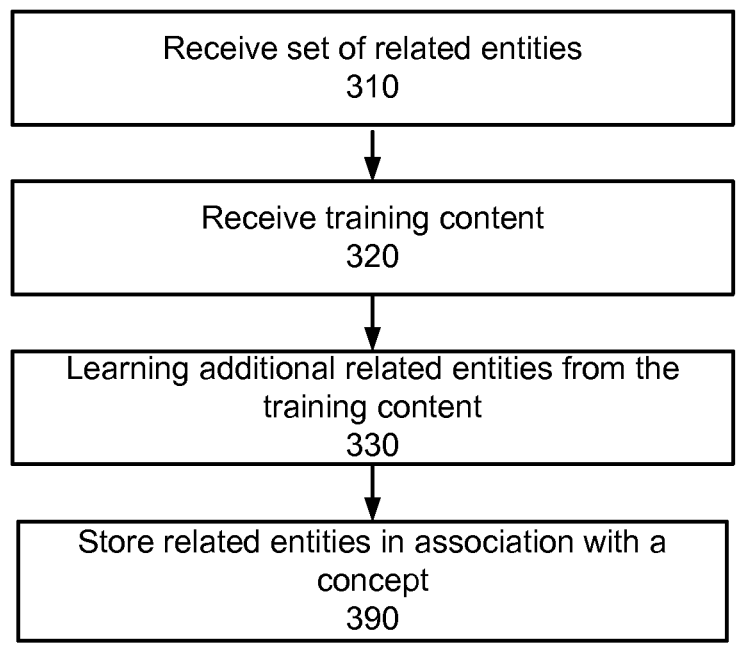
FIG. 3A illustrates a flow chart of a method for training the entity analysis system according to one embodiment.
Figure 3B:
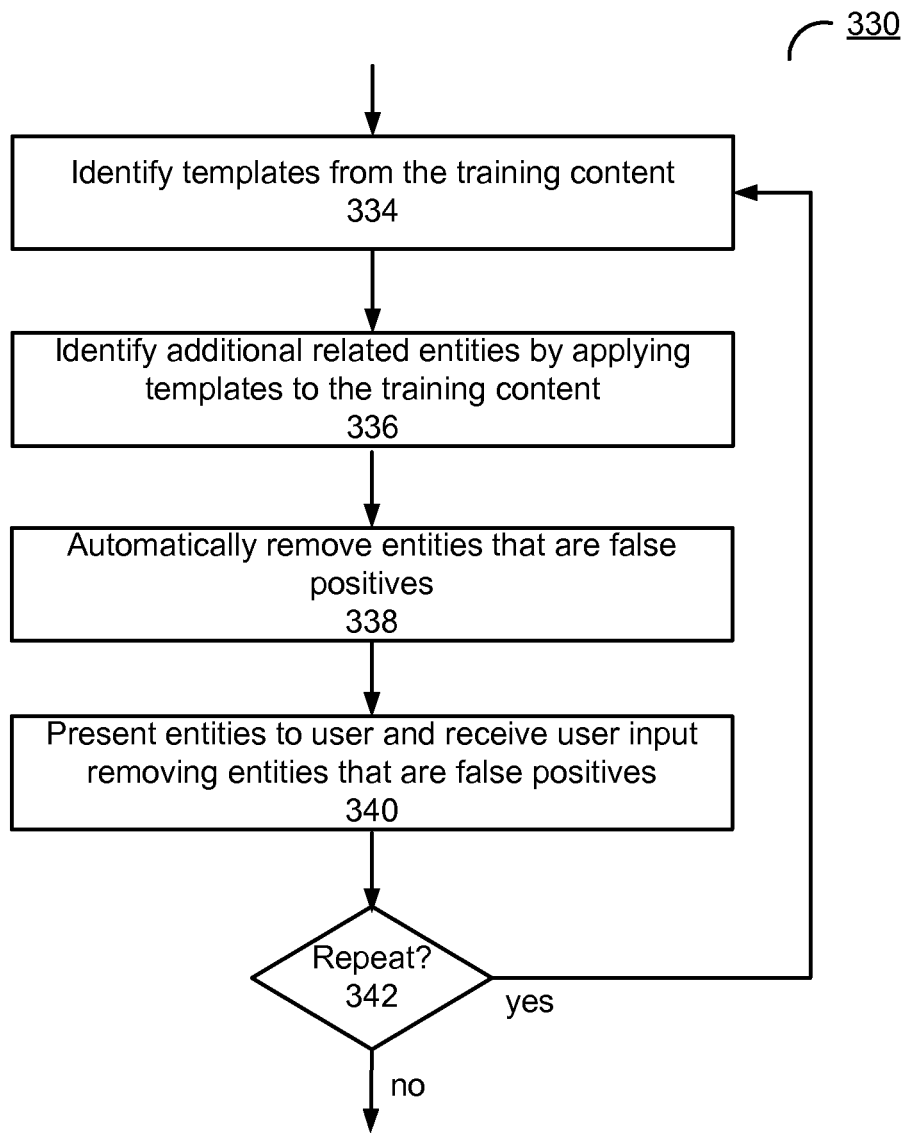
FIG. 3B illustrates a more detailed view of the step of learning additional related entities from FIG. 3A according to one embodiment.
Figure 4:
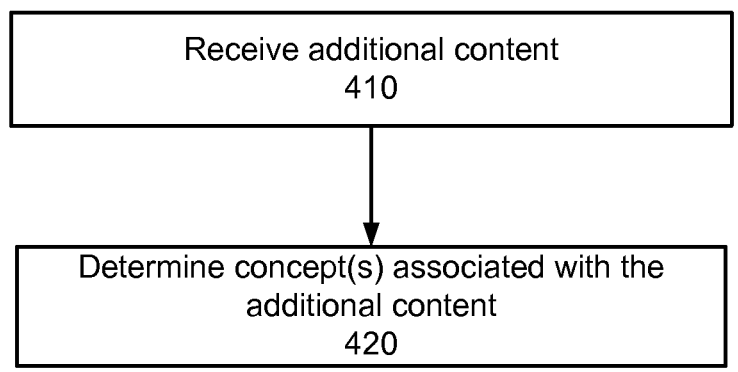
FIG. 4 illustrates a method for analyzing additional content according to one embodiment.

The storage unit 116 includes a machine-readable medium (or machine-reachable storage medium) 122 on which is stored instructions 124 (e.g., software) embodying any one or more of the methodologies or functions described herein (e.g., FIGS. 2-4). The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Entity Analysis System Overview

Turning now to FIG. 2, illustrated is a block diagram of an entity analysis system 200 according to one embodiment. For purposes of illustration, FIG. 2 divides operation of the entity analysis system 200 into two stages, training and analysis. However, in various embodiments, these types of operation may occur in conjunction with each other. In an embodiment, the entity analysis system is implemented by a computing system 100, as described above in conjunction with FIG. 1.

During training, a training module 230 identifies a set of entities that are related to a particular concept. For example, if the concept is "US Presidents," the training module 230 identifies a set of entities such as "Ronald Reagan" and "Richard Nixon." The relationship between an entity and a concept can be viewed as an "is a" relationship in the sense that an entity is a sub-species of a concept. For example, "Abraham Lincoln" is a "US President" and "George Washington" is a "US President." Many of the embodiments disclosed herein will be explained by using the concept of US Presidents as an illustrating example. However, many other types of entities and concepts are also possible. For example, the entities associated with the concept of "Human Being" would include "Mayor" and "US President." As a further example, the entities associated with the concept of "Sports" would include "Football" and "Basketball."

The training module 230 receives training content 210 and a set of entities 220 as inputs. The set of entities 220 includes one or more entities that are already known to be related to a particular concept. For example, to build a set entities that are US Presidents, the training module 230 may receive the predetermined entities 220 "Bill Clinton" and "Barack Obama" as inputs from a supervisor of the system. The training content 210 includes any type of textual content (e.g., words organized into sentences and paragraphs). Examples of training content 210 include web-pages, news articles, books, posts to online message forums, etc. The predetermined entities and related entities that have not yet been identified may be distributed throughout the training content.

The training module 230 uses the set of predetermined entities 220 in analyzing the training content 210 to identify additional entities that are related to the predetermined entities 220. Specifically, the training module 230 identifies templates, which are word patterns that appear frequently in conjunction with the set of predetermined entities 220. The templates are then applied to the training content to identify additional entities. In other words, the set of predetermined entities 220 acts as a bootstrap that initiates the learning process of the training module 230 for identifying additional related entities. For example, if the set of predetermined entities 220 includes Bill Clinton and Barack Obama, the training module 230 may identify the phrase " . . . was elected" as a template that appears commonly along with these entities. The training module then searches the training content 210 for entities that appear in conjunction with and fit the template " . . . was elected" to identify additional entities such as Ronald Reagan and Richard Nixon. The training module 230 repeats this process several times, identifying additional entities with each iteration that are fed back into the training module 230 in subsequent iterations. This process is explained in greater detail by reference to FIG. 3A-3B.

In one embodiment, templates may be identified by comparing the parts-of-speech (PoS) patterns of potential templates to the PoS patterns of other templates. A PoS pattern comprises PoS tags that explain how words are grammatically used in a sentence based on the definition of the word as well as its context (i.e., relationship with adjacent words). Common PoS tags are adjective, preposition, types of verbs, and types of nouns, etc. Groups of words that have PoS patterns matching the PoS patterns of other templates are more likely to be identified as valid templates.

Identifying templates based on their PoS patterns is beneficial because it increases the speed with which additional entities are identified. However, using templates inferred from PoS patterns to identify related entities may increase the risk of false positives. In one embodiment, to eliminate false positives, the training module 230 includes functionality that automatically attempts to eliminate false positives and/or presents the additional entities to a user and receives a user input removing false positives. Identifying templates with PoS analysis and then eliminating false positives with a user input is beneficial because it increases the speed of identifying related entities without sacrificing accuracy.

The ontology 240 of related entities is a datastore that tracks the relationships between entities and their related concepts. In one embodiment, the ontology 240 is organized as a data graph that includes a plurality of nodes and edges that connect the nodes. Each node represents a particular entity (e.g., Barack Obama) or concept (e.g., US Presidents). Nodes are connected by edges that represent the relationships between the nodes. For example, the node for Barack Obama may be linked to the concept of US Presidents through an edge in the data graph. Concepts themselves can be entities that are linked to other concepts. For example, the node for US Presidents may also represent an entity that is linked to the concept of Humans. In one embodiment, the concepts in the ontology are also stored in association with the templates used to create the ontology. In other embodiments, other types of data structures may be used to store and represent the relationship between concepts and entities.

Once the ontology 240 is built, the content analysis module 260 receives additional content 250 and uses the ontology 240 to identify one or more concepts 270 associated with the additional content 250. Additional content 250 includes textual content, such as web-pages, news stories, messages posted to online message forums, messages posted to social networking websites, etc. For example, the additional content 250 may include the sentence "People that support George Bush do not support Barack Obama." Using the ontology 240, the content analysis module 260 determines that the sentence includes the entities of George Bush and Barack Obama. Because these two entities are both associated in the ontology 240 with US Presidents, the content analysis module determines that the content 250 is associated with the concept 270 of US Presidents. Additional language processing techniques may also be combined with the relationships in the ontology 240 to analyze the nature and topic of any additional content 250.

System Training

Turning now to FIG. 3A, illustrated is a flow chart of a method for training the entity analysis system 200 according to one embodiment of the training module 230. In an embodiment, the steps depicted in the method shown in FIG. 3A are implemented by instructions for performing the described actions. The instructions are embodied or stored within a machine-readable medium 122, such as a main memory 104 or a storage unit 116 memory. In addition, the instructions are executable by a processor 102. Those of skill in the art will recognize that the method may be implemented in embodiments of hardware and/or software or combinations thereof. Those of skill in the art will recognize that other embodiments can perform the steps of FIG. 3A in different orders or include different and/or additional steps than the ones described herein.

In step 310, the training module 230 receives a set of related entities. The set of related entities includes a plurality of entities that are predetermined to be related to a particular concept. For example, the training module may receive the entities "Bill Clinton" and "Barack Obama" as entities that are known to be related to the concept of "US Presidents." The set of related entities may be received in any of number of ways, for example, from a user input specifying the set of related entities or from a file stored on disk that includes the set of related entities. The set of related entities acts as a bootstrap for initiating the learning process.

In step 320, the training module 230 receives training content. The training content 210 includes any type of textual content (e.g., words organized into sentences and paragraphs). Examples of training content 210 include webpages, news articles, books, posts to online message forums, etc. The predetermined entities and related entities that have not yet been identified may be distributed throughout the training content. Training content can be received from any of a number of different sources, for example, from a file stored on a local disk or from another computing device via a network.

In step 330, the training module 230 identifies additional entities in the training content that are related to the predetermined entities. For example, if Bill Clinton and Barack Obama are the predetermined entities, the training module may identify Ronald Reagan and Richard Nixon as additional entities that are related to Bill Clinton and Barack Obama. All of these entities are related to the same concept of US Presidents. In one embodiment, identifying additional entities is an iterative process that repeats one or more times to identify a complete set of related entities. Step 330 is explained in greater detail conjunction with FIG. 3B.

In step 390, the predetermined entities and any additional entities are stored in association with a common concept. For example, Bill Clinton, Barack Obama, Ronald Reagan, and Richard Nixon may be stored into the ontology in association with the concept of US Presidents. In one embodiment, the concept is received as a user input from an administrator of the entity analysis system.

Referring now to FIG. 3B, illustrated is a flow chart of the step for identifying 330 additional related entities from FIG. 3A according to one embodiment. In an embodiment, the steps depicted in the method shown in FIG. 3B are implemented by instructions for performing the described actions. The instructions are embodied or stored within a machine-readable medium 122, such as a main memory 104 or a storage unit 116 memory. In addition, the instructions are executable by a processor 102. Those of skill in the art will recognize that the method may be implemented in embodiments of hardware and/or software or combinations thereof. Those of skill in the art will recognize that other embodiments can perform the steps of FIG. 3B in different orders or include different and/or additional steps than the ones described herein.

In step 334, the training module 230 identifies templates from the training content. Templates are word patterns that appear commonly or frequently in conjunction with known related entities. In one embodiment, templates may be groups of one or more words that immediately precede the related entities in the training content. For example, if Bill Clinton and Barack Obama are entities related to the concept of US Presidents, commonly appearing word patterns may be "President of the United States _" and "Election of _". In another embodiment, templates may be groups of one or more words that immediately follow the related entities in the training content. For example, "_ was the only president of the United States to" and "_ was elected", and "_ was inaugurated", and "_ lived in the White House." Templates may also be groups of words that surround (e.g. both precede and follow) the related entities in the training content. For example, "President _ delivered the State of the Union." Other templates are also possible, and templates are not limited to the specific examples disclosed herein.

In one embodiment, the training module 230 identifies templates from a statistical analysis of the training content. In one embodiment, only words that are within a limited distance of the entities (e.g., less than five words away) are analyzed when identifying templates. The relationship between the entities and different word patterns may be maintained in a co-occurrence table that tracks the number of times that each entity appears in conjunction with the word patterns. One example of a co-occurrence table is as follows:

|  | "_was elected" | "_plays basketball" | "_plays saxophone" |
| --- | --- | --- | --- |
| Bill Clinton | 1050 | 3 | 300 |
| Barack Obama | 994 | 250 | 0 |

This table shows that Bill Clinton appeared 1050 times in conjunction with "_ was elected", 3 times in conjunction with "_ plays basketball" and 300 times in conjunction with "_ plays saxophone." Barack Obama appears 994 times in conjunction with "_ was elected", 250 times in conjunction with "_ plays basketball" and 0 times in conjunction with "_ plays saxophone."

Word patterns (i.e., potential templates) are given a confidence score that is a function of how often the words patterns appear in conjunction with the predetermined entities. Word patterns appearing with a high frequency in conjunction with the predetermined entities have a high confidence score. Word patterns appearing with a lower frequency in conjunction with the predetermined entities have a low confidence score. Word patterns with confidence scores exceeding a threshold value are considered valid templates. The threshold may be absolute (e.g., above a predetermined score) or relative (e.g., in the $90^{th}$ percentile). For example, the word pattern "_ was elected" has a high confidence score because it appears frequently in conjunction with both "Bill Clinton" and "Barack Obama," whereas the word patterns of "_ plays basketball" and "_ plays saxophone" have a low confidence score.

In one embodiment, the training module 230 also infers templates by analyzing the parts-of-speech of the word patterns. Each potential template is tagged with its parts-of-speech (PoS). A PoS tag explains how words are used in a sentence based on the definition of the word as well as its context (i.e., relationship with adjacent words). Parts-of-speech tagging is sometimes referred to as grammatical tagging. For example, the template "_ was elected" is tagged as having a Past Tense Verb (VBD) and a Past Participle (VBN). The PoS pattern for the template "_ was elected" is thus VBD-VBN. Many other PoS patterns can be identified in this manner, such as adjectives, adverbs, conjunctions, articles, different types of nouns, different types of verbs, etc.

Once tagged, the training module 230 uses the PoS pattern for a potential template as an additional factor in determining whether it should be treated as a valid template. In one embodiment, the PoS pattern is compared to the PoS patterns of other templates, for example, other potential templates, existing templates from previous iterations of the process in FIG. 3B, and/or a subset of potential templates that have high confidence scores. If the PoS pattern of a potential template is similar to the PoS patterns of the other templates, the confidence score of the template can be increased, potentially pushing it over the threshold needed to be considered a valid template. For example, suppose most templates for the concept of US Presidents have a PoS pattern of VBD-VBN. A potential template of " . . . was re-elected" may not have the highest initial confidence score since not all US Presidents were re-elected. However, this potential template does share the common PoS pattern of VBD-VBN. Thus, the confidence score of this potential template would be increased accordingly.

Advantageously, by using PoS patterns as an additional factor in identifying valid templates, the disclosed embodiments learn at a faster pace than conventional systems. The use of PoS patterns allows for identification of additional templates that would otherwise be considered irrelevant or ignored until a later iteration of the process in FIG. 3B. This leads to a higher number of related entities being identified in the next step 336 when the templates are applied to the training content. On the flip side, applying templates identified through PoS analysis may lead to increased identification of related entities that are actually false positives. The false positives are mitigated through the additional filtering steps described in step 340.

In step 336, the training module 230 identifies a set of candidate entities that are likely to be related to the predetermined entities by applying the templates to the training content. These entities are referred to as candidates because they may or may not actually be related to the same concept as the predetermined entities. In one embodiment, the training module 230 iteratively applies the templates one at a time. With each iteration, the training module 230 locates a template in one or more locations throughout the training content and identifies entities that appear with and fit the templates. The co-occurences of the templates and entities can be tracked in a co-occurrence table. Entities that appear with a statistically relevant frequency (i.e., above some threshold) in conjunction with the templates are determined to be related to the predetermined entities. For example, "Richard Nixon" probably appears with a high frequency in the training content in conjunction with the templates "_ was elected" and "United States President _." Thus, Richard Nixon would be identified as an candidate entity that could be related to the predetermined entities of Barack Obama and Bill Clinton.

In one embodiment, the training module 230 only identifies candidate entities that share a common PoS tag as the predetermined entities that were used to bootstrap the learning process. For example, suppose the predetermined entities are Barack Obama and Bill Clinton. The predetermined entities are both proper nouns, and so the training module 230 would only identify additional entities that are also proper nouns.

In step 338, the training module 230 removes false positives from the set of candidate entities. Filtering out false positives is useful because the initial steps of identifying templates and applying templates may lead to erroneous results. For example, if building a list of US Presidents starting with the predetermined entities of Barack Obama and Bill Clinton, the training module 230 may erroneously identify Washington D.C. as an additional related entity.

In one embodiment, the training module 230 removes false positives by determining whether the entities are related to one or more "filtering concepts." Some filtering concepts are positive concepts, which are concepts that the identified entities should be related to. For example, if the target concept is US Presidents, an entity that is a US President should also be related to the concept of Human Beings (i.e., US Presidents are Human Beings). Some filtering concepts are negative concepts, which are concepts that the identified entities should not be related to. For example, an entity that is a US President should not be related to the concept of Cities (i.e., US Presidents are not Cities).

The filtering concepts will differ depending on the nature of the target concept that the predetermined entities are related to. In one embodiment, a user configures the training module 230 with the appropriate filtering concepts. Each filtering concept is generally associated with one or more filtering templates that are already known. For example, entities that are Humans will typically fit templates such as "_ was born on" and "_ lived in." Entities that are Cities will typically fit templates such as "_ is located in the state of" or "the mayor of _." The training module 230 searches the training content to identify co-occurrences of entities and the filtering templates. The co-occurrences are statistically analyzed to determine whether the entities are related to the filtering concepts. Candidate entities related to positive concepts are kept because entities should be related to the positive concepts (i.e., candidate entities that are unrelated to positive concepts are removed). Candidate entities related to negative concepts are removed because entities should not be related to negative concepts.

In step 340, the training module 230 module engages in a second filtering step by presenting the set of candidate entities for display to a user and receiving a user input selecting one or more of the entities for removal. Responsive to receiving the user input, the training module 230 removes the selected entities. The user input may be, for example, a mouse, keyboard, or touch-screen input. The user input may explicitly select one or more entities for removal by identifying the entities that are false positives. The user input may also implicitly select one or more entities for removal by selecting one or more entities to keep. Advantageously, eliminating false positives with a user input enables greater accuracy in identifying related entities than is possible with conventional unsupervised learning systems. Eliminating false positives with a user input also mitigates any loss in accuracy caused by inferring templates with PoS tagging. Thus, the disclosed embodiments can benefit from the faster identification of related entities that stems from inferring templates with PoS tagging without sacrificing accuracy in the end results.

In step 342, the training module 230 determines whether to identify more related entities, and if so, steps 334-340 are repeated. The original set of entities is updated with the set of candidate entities identified in the previous iteration of the process and fed back into the process at step 334. With each iteration, the number of related entities increases and the system becomes more accurate in identifying additional related entities. Steps 334-342 are repeated in this manner until a terminating event occurs, such as a user input stopping the system, the passage of time, or when no more entities can be identified. All of the related entities are then stored in association with a common concept, for example, the concept of "US Presidents."

In one embodiment, the training module 230 keeps track of any entities that are identified as false positives in steps 338 and 340. In subsequent iterations of the process in FIG. 3B, the training module 230 uses this information to avoid re-identification of entities that were already flagged as false positives. In another embodiment, the training module 230 determines which templates tend to cause a high number of false positives. These templates can be ignored in subsequent iterations of the process in FIG. 3B, or alternatively, the confidence scores for these templates can be reduced. For example, the template "_ was elected" may occur frequently in conjunction with non US presidents such as former Brazilian president Fernando Collor. Once this president is identified as a false positive, the training module 230 may decrease the confidence score for or completely ignore the template "_ was elected" during subsequent iterations of the process.

In one embodiment, the user input in step 340 is not used to remove entities that are false positives in all iterations of the process in FIG. 3B. Instead, the user input may only be used to remove false positives during the first few iterations of the process and then used selectively in later iterations of the process. Pruning out erroneous results is generally more important during the initial iterations of the process to prevent drift. Once the training module 230 has identified a sufficient number of related entities, the risk of drift becomes lower. Alternatively, the user may only be given the opportunity to review the entities at periodic intervals, for example, once in every ten iterations.

Analysis of Additional Content

Referring now to FIG. 4, illustrated is a method for analyzing additional content according to one embodiment of the content analysis module 260. In an embodiment, the steps depicted in the method shown in FIG. 4 are implemented by instructions for performing the described actions embodied or stored within the machine-readable medium 122, such as the main memory 104 or the storage unit 116 memory, which are executable by the processor 102. Those of skill in the art will recognize that the method may be implemented in embodiments of hardware and/or software or combinations thereof. Those of skill in the art will recognize that other embodiments can perform the steps of FIG. 4 in different orders or include different and/or additional steps than the ones described herein.

In step 410, the content analysis module 260 receives additional content. For example, the additional content may be web-pages, posts to online message forums, posts to social networking websites, etc.

In step 420, the content analysis module 260 determines one or more concepts that are associated with the additional content. In one embodiment, the content analysis module parses the additional content into word groups and searches the ontology for entities that match the word groups. Concepts associated with matching entities are determined to be associated with the content. For example, suppose the additional content includes the sentence "People that support George Bush do not support Barack Obama." Using the information in the ontology, the content analysis module 260 determines that because the sentence includes the entities of George Bush and Barack Obama, both of which are linked to the concept of US presidents in the ontology, the content is associated with the concept of US Presidents. Additional language processing techniques may also be combined with the concepts retrieved from the ontology to analyze the nature and topic of any additional content.

The disclosed embodiments thus enable the creation of large datastore of factual information that associates entities with their related concepts. The information and relationships in the datastore are useful, for example, for analyzing and identifying the topics of additional content. In some embodiments, the datastore is created by inferring templates with PoS tagging, which also increases the number of related entities that can be properly identified. In other embodiments, to eliminate false positives and to avoid drift in subsequent iterations of the process, the identified entities are presented to a user and any false positives are removed in response to a user input.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described as including logic or a number of components, modules, or mechanisms. Modules, e.g., as in FIG. 2, may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein, for example, those described in FIGS. 2-4. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein (e.g., in FIGS. 2-4) may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for determining related entities. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method of learning related entities, the method comprising:
    receiving a set of entities, the set of entities including a plurality of entities and each entity in the set of entities relating to a first concept;
    receiving training content that includes textual content that is organized and that includes the plurality of entities of the set of entities; and
    learning additional entities that are related to the first concept by iteratively performing the following steps:
        identifying one or more potential word templates from the training content based on occurrences of one or more words in the training content with an entity of the set of entities, wherein each potential word template is one or more words, and wherein each potential word template is tagged with a part-of-speech tag based on grammatical use of the one or more words in the training content;
        identifying one or more word templates from the one or more potential word templates based on a frequency of occurrence of the one or more potential word templates and based on the part-of-speech tag of the one or more potential word templates compared to part-of-speech tags of word templates of a set of word templates, wherein the one or more identified word templates are added to the set of word templates;
        identifying, for each identified word template, one or more part-of-speech tags of the identified word templates;
        adjusting, for each identified word template, a confidence score of the identified word template when the one or more part of speech tags of the identified word template is similar to the part-of-speech tags of word templates of a set of word templates;
        adjusting, for each identified word template, the confidence score of the identified word template when the identified word template is identified as being a false positive;
        comparing, for each identified word template, the confidence score of the identified word template to a threshold value;
        removing the identified word template from the set of word templates when the confidence score of the identified word template is outside the threshold value;
        identifying one or more candidate entities that relate to the first concept based on occurrences of each of the one or more candidate entities in the training content with at least one of the word templates of the set of word templates, wherein the one or more candidate entities are added to a set of candidate entities;
        identifying a part-of-speech tag for each candidate entity;
        removing a candidate entity from the set of candidate entities when the part-of-speech tag of the candidate entity is different from a part-of-speech tag of the set of entities;
        receiving an external input selecting candidate entities for removal if the selected candidate entities do not relate to the first concept from the set of candidate entities;
        removing candidate entities from the set of candidate entities based on the received external input;
        adding one or more candidate entities remaining in the set of candidate entities to the set of entities; and
        storing the set of entities in association with the first concept.

2. The method of claim 1, wherein identifying one or more candidate entities that relate to the first concept further comprises:
    removing one or more candidate entities from the set of candidate entities based on whether the one or more candidate entities are related to a second concept,
    wherein the second concept does not relate to the first concept.

3. A computer-implemented method of learning related entities, the method comprising:
    receiving a set of entities, the set of entities including a plurality of entities and each entity in the set of entities relating to a first concept;
    receiving training content that includes textual content that is organized and that includes the plurality of entities of the set of entities; and
    learning additional entities that are related to the first concept by iteratively performing the following steps:
        identifying one or more word templates from the training content based on occurrences of one or more words in the training content with an entity of the set of entities, wherein each word template is one or more words, and wherein the one or more identified word templates are added to a set of word templates;
        identifying, for each identified word template, one or more part-of-speech tags of the identified word templates;
        adjusting, for each identified word template, a confidence score of the identified word template when the one or more part of speech tags of the identified word template is similar to the part-of-speech tags of word templates of a set of word templates;
        adjusting, for each identified word template, the confidence score of the identified word template when the identified word template is identified as being a false positive;

comparing, for each identified word template, the confidence score of the identified word template to a threshold value;
removing the identified word template from the set of word templates when the confidence score of the identified word template is outside the threshold value;
identifying one or more candidate entities that relate to the first concept based on occurrences of each of the one or more candidate entities in the training content with at least one of the word templates of the set of word templates, wherein the one or more identified candidate entities are added to a set of candidate entities;
identifying a part-of-speech tag for each candidate entity;
removing a candidate entity from the set of candidate entities when the part-of-speech tag of the candidate entity is different from the part-of-speech tag of the set of entities;
receiving an external input selecting candidate entities for removal if the selected candidate entities do not relate to the first concept from the set of candidate entities;
removing candidate entities from the set of candidate entities based on the received external input; and
adding one or more candidate entities remaining in the set of candidate entities to the set of entities.

4. The method of claim 3, wherein identifying one or more word templates from the training content further comprises:
tagging each of the one or more words in the training content that occur with the entity of the set of entities with a part-of-speech tag based on grammatical use of the one or more words in the training content that occur with the entity of the set of entities;
identifying the one or more word templates based on the part-of-speech tag of the one or more words in the training content that occur with the entity of the set of entities.

5. The method of claim 4, wherein identifying one or more word templates based on the part-of-speech tag of the one or more words in the training content that occur with the entity of the set of entities comprises:
identifying the one or more word templates based on similarities between the part-of-speech tag of the one or more words in the training content that occur with the entity of the set of entities and part-of-speech tags of word templates in the set of word templates.

6. The method of claim 4, wherein identifying one or more word templates based on the part-of-speech tag of the one or more words in the training content that occur with the entity of the set of entities comprises:
identifying the one or more word templates based on similarities between the part-of-speech tag of the one or more words in the training content that occur with the entity of the set of entities in a current iteration and part-of-speech tags of word templates in the set of word templates identified in a previous iteration.

7. The method of claim 3, wherein identifying one or more candidate entities that relate to the first concept based on occurrences of each of the one or more candidate entities in the training content with at least one of the word templates of the set of word templates further comprises:
identifying the one or more candidate entities based a grammatical use of the candidate entities and a part-of-speech tag of the entities of the set of entities.

8. The method of claim 3, wherein learning additional entities that are related to the first concept further comprises:
receiving an external input to remove candidate entities that do not relate to the first concept from the set of candidate entities; and
removing candidate entities from the set of candidate entities based on the received input.

9. The method of claim 8, wherein learning additional entities that are related to the first concept further comprises:
searching an ontology database of related entities and concepts for a second concept that relates to a candidate entity in the set of candidate entities, wherein the ontology database includes the set of entities that relate to the first concept;
determining whether the second concept relates to the first concept; and
removing candidate entities from the set of candidate entities when the second concept of the candidate entity does not relate to the first concept.

10. The method of claim 8, wherein learning additional entities that are related to the first concept further comprises:
searching an ontology database of related entities and concepts for a second concept that relates to a candidate entity in the set of candidate entities, wherein the ontology database includes the set of entities that relate to the first concept;
determining whether the second concept relates to the first concept; and
adding the candidate entities to the set of entities that relates to the first concept when the second concept of the candidate entity relates to the first concept.

11. The method of claim 3, wherein the first concept is a classification of each entity in the set of entities.

12. The method of claim 3, wherein each entity in the set of entities is a proper noun.

13. The method of claim 8, wherein the received input to remove candidate entities from the set of candidate entities is a selection by a user of candidate entities to remove from the set of candidate entities.

14. The method of claim 8, wherein the received input to remove candidate entities from the set of candidate entities is a selection by a user of candidate entities to keep in the set of candidate entities.

15. The method of claim 8, wherein the received input to remove candidate entities from the set of candidate entities is received in fewer than all iterations.

16. The method of claim 3, wherein a word template of the set of word templates includes one or more words that precede an entity of the set of entities within the training content.

17. The method of claim 3, wherein a word template of the set of word templates includes one or more words that follow an entity of the set of entities within the training content.

18. The method of claim 3, wherein a word template of the set of word templates includes one or more words that surround an entity of the set of entities within the training content.

19. The method of claim 3, further comprising storing the set of entities in association with the first concept.

20. A computer product for learning related entities, the computer product comprising a non-transitory computer-readable medium containing computer program code for performing the method comprising:
receiving a set of entities, the set of entities including a plurality of entities and each entity in the set of entities relating to a first concept;

receiving training content that includes textual content that is organized and that includes the plurality of entities of the set of entities; and learning additional entities that are related to the first concept by iteratively performing the following steps:

identifying one or more word templates from the training content based on occurrences of one or more words in the training content with an entity of the set of entities, wherein each word template is one or more words, and wherein the one or more identified word templates are added to a set of word templates;

identifying, for each identified word template, one or more part-of-speech tags of the identified word templates;

adjusting, for each identified word template, a confidence score of the identified word template when the one or more part of speech tags of the identified word template is similar to the part-of-speech tags of word templates of a set of word templates;

adjusting, for each identified word template, the confidence score of the identified word template when the identified word template is identified as being a false positive;

comparing, for each identified word template, the confidence score of the identified word template to a threshold value;

removing the identified word template from the set of word templates when the confidence score of the identified word template is outside the threshold value;

identifying one or more candidate entities that relate to the first concept based on occurrences of each of the one or more candidate entities in the training content with at least one of the word templates of the set of word templates, wherein the one or more identified candidate entities are added to a set of candidate entities;

identifying a part-of-speech tag for each candidate entity;

removing a candidate entity from the set of candidate entities when the part-of-speech tag of the candidate entity is different from a part-of-speech tag of the set of entities;

receiving an external input selecting candidate entities for removal if the selected candidate entities do not relate to the first concept from the set of candidate entities;

removing candidate entities from the set of candidate entities based on the received external input; and adding the one or more candidate entities of the set of candidate entities to the set of entities.

* * * * *